US012268998B2

(12) United States Patent
Shen (10) Patent No.: US 12,268,998 B2
(45) Date of Patent: Apr. 8, 2025

(54) WEIGHT-VOLUME MIXING COLOR MATCHING METHOD, RECLAMATION MECHANISM AND AUTOMATIC COLOR MIXER FOR AUTOMOBILE REFINISHING PAINTINGS (71) Applicant: ZHENGZHOU SANHUA TECHNOLOGY & INDUSTRY CO., LTD., Henan (CN)

(72) Inventor: Ruhua Shen, Henan (CN)

(73) Assignee: ZHENGZHOU SANHUA TECHNOLOGY & INDUSTRY CO., LTD., Henan (CN)

( * ) Notice: Subject to any disclaimer, the term of this patent is extended or adjusted under 35 U.S.C. 154(b) by 1069 days.

(21) Appl. No.: 17/274,124

(22) PCT Filed: Sep. 16, 2019

(86) PCT No.: PCT/CN2019/105989
§ 371 (c)(1),
(2) Date: Mar. 5, 2021

(87) PCT Pub. No.: WO2020/057464
PCT Pub. Date: Mar. 26, 2020

(65) Prior Publication Data
US 2021/0252465 A1    Aug. 19, 2021

(30) Foreign Application Priority Data

Sep. 17, 2018  (CN) .......................... 201811078429.7
Sep. 17, 2018  (CN) .......................... 201811078430.X
(Continued)

(51) Int. Cl.
B01F 33/00    (2022.01)
B01F 27/91    (2022.01)
(Continued)

(52) U.S. Cl.
CPC ............ B01F 33/848 (2022.01); B01F 27/91 (2022.01); B01F 35/2116 (2022.01);
(Continued)

(58) Field of Classification Search
CPC ................ B01F 33/848; B01F 2101/30; B01F 35/2116; B01F 35/2117
See application file for complete search history.

(56) References Cited

U.S. PATENT DOCUMENTS 4,323,097 A * 4/1982 Achen ..................... B01F 33/84
141/168
7,743,055 B2    6/2010 Rodrigues et al.
(Continued)

FOREIGN PATENT DOCUMENTS

CN     1643351 A      7/2005
CN     201176103 Y    1/2009
(Continued)

OTHER PUBLICATIONS

Weelan (EP 1820568 Machine Translation) (Year: 2007).*
(Continued)

Primary Examiner — Anshu Bhatia
(74) Attorney, Agent, or Firm — HSML P.C.

(57) ABSTRACT

A weight-volume mixing color matching method, reclamation mechanism and automatic color mixer for automobile refinishing paintings are discussed. The method comprises (1) finding out an automobile information ID card printed with a color number on an automobile body to be refinished, finding out a color code of the automobile body or getting a close color card code through comparison, and finding out a weight formula of the refinishing paints to be used through a reader or a computer color-matching system; or using a spectrophotometer to detect coatings of the automobile body to be refinished at a position where a surface of the coatings
(Continued)

is complete, and outputting a weight formula of the refinishing paints after calculation; and (2) converting the weight formula of the refinishing paints into a corresponding volume formula of the refinishing paints according to a measured specific gravity of a color masterbatch.

18 Claims, 9 Drawing Sheets

(30) Foreign Application Priority Data

Sep. 17, 2018 (CN) .......................... 201811078436.7
Sep. 17, 2018 (CN) .......................... 201821510123.X
Sep. 17, 2018 (CN) .......................... 201821510136.7

(51) Int. Cl.
*B01F 33/84* (2022.01)
*B01F 35/21* (2022.01)
*B01F 101/30* (2022.01)

(52) U.S. Cl.
CPC ...... *B01F 35/2117* (2022.01); *B01F 35/2134* (2022.01); *B01F 2101/30* (2022.01)

(56) References Cited

U.S. PATENT DOCUMENTS

| | | | |
|---|---|---|---|
| 2004/0030510 A1* | 2/2004 | Van Biemen | B01F 33/84 356/402 |
| 2005/0252934 A1* | 11/2005 | Miller | F16K 23/00 222/135 |
| 2018/0126346 A1* | 5/2018 | Post | B01F 33/846 |

FOREIGN PATENT DOCUMENTS

| | | |
|---|---|---|
| CN | 103968106 A | 8/2014 |
| CN | 104645872 A | 5/2015 |
| CN | 105757023 A | 7/2016 |
| CN | 206415020 U | 8/2017 |
| CN | 108194304 A | 6/2018 |
| CN | 108940112 A | 12/2018 |
| CN | 109107429 A | 1/2019 |
| CN | 109173827 A | 1/2019 |
| CN | 209061065 U | 7/2019 |
| CN | 209333581 U | 9/2019 |

OTHER PUBLICATIONS

Internal Search Report (with English translation) and Written Opinion issued in PCT/CN2019/105989, mailed Dec. 17, 2019, 15 pages provided.

* cited by examiner

WEIGHT-VOLUME MIXING COLOR MATCHING METHOD, RECLAMATION MECHANISM AND AUTOMATIC COLOR MIXER FOR AUTOMOBILE REFINISHING PAINTINGS

TECHNICAL FIELD

The present invention relates to the field of automatic blending of automobile refinishing paints, and particularly relates to a weight-volume mixing color matching method for automobile refinishing paints.

BACKGROUND ART

The damaged parts of automobile paint need to be repainted with automobile refinishing paints. Different automobile refinishing paints require different color masterbatches. In order to meet the needs of different automobiles, there are many types of color masterbatch required for automobile paint color matching, that is, about 50 to 90 types, which are far more than the types of latex paints. There are so many color masterbatch buckets on the automatic automobile refinishing paint color mixer, which requires a larger space. For any automatic color matching of automobile refinishing paints, it is necessary for the paint mixing cup to move to the front of all required color masterbatch buckets to receive materials, which requires the automatic color mixer to have an accurate and complex transmission system, thereby the cost is increased. Therefore, there is a need for an automatic automobile refinishing paint color mixer that occupies a small space and is low in cost.

One of the common methods in color matching before painting automobile refinishing paints is to find the color card with the same color by comparing the color card with the automobile color, find the color masterbatch ratio and the weight formula of each color masterbatch from the color matching software database in the computer according to the color card number, and manually weigh the color masterbatch according to the formula, mix and stir to prepare automobile refinishing paints (hereinafter referred to as automobile paint for short) with the same color as the color card. In addition to low labor efficiency, and the automobile refinishing paints prepared according to the color card usually has certain deviation from the automobile color, which requires further manual adjustment, which is laborious and has high technical requirements for the color matching worker, and requires experienced color matching worker to prepare automobile paint with the same color.

In the prior art, there is also a method for finding the paint formula when leaving the factory according to the model or paint code of the automobile or measuring the automobile surface paint by using an optical instrument (spectrophotometer) to obtain the paint formula. This method is suitable for the analysis of most automobile surface paints, and is relatively accurate, which reduces the error between the color of the automobile paint prepared by the formula according to the model or paint code and the actual automobile paint. But even so, the previous statistics show that a considerable ratio of automobile surface paints still have chromatic aberration after one color matching, and further manual color matching correction is needed. Therefore, current color matching of automobile refinishing paints requires high manual work and relies heavily on it, while the efficiency of manual color matching is low. Especially, some paint mixing shops have a large amount of color matching per day, which can reach dozens or hundreds, and one color matching worker cannot complete it. Some shops even need two or four color matching workers. Even so, because of the high labor intensity, poor environment (colors are stuck everywhere, even on people's bodies), and it takes a long time to accumulate technology, people are still unwilling to do the job of color matching workers. On the other hand, it is very difficult to recruit an excellent color matching worker, because no one are willing to it if the salary is low. However, today's color matching technicians are necessary, but for a paint mixing shop with a small amount of color matching business or the color matching is only an auxiliary business (for example, some 4S shops), the income from paint mixing cannot cover the salary of a color matching worker. Therefore, if there is a device for automatically and accurately matching the master batch of each color in the market, the purposes of improving efficiency, reducing technical requirements for color matching and reducing labor costs can be achieved.

In fact, in recent years, some enterprises have developed automatic color mixers for automobile refinishing paints. But it failed to form a stable product to put into the market. As we all know, the existing mature and general color matching methods of automobile paint in the world all adopt the way of weight ratio, and a worker manually pours out the color masterbatch from the paint bucket, weighs it and conducts color matching. That is to say, according to the weight requirements of the required color masterbatch, the color masterbatch is poured out manually from the color masterbatch bucket with a paste cover on the upper part through the paste outlet on the paste cover. Then, the weight of required color matching masterbatch is weighed on the electronic scale. In this way, the color matching masterbatch in each formula is poured out of the color masterbatch bucket and weighed to achieve the required weight. Then, the color matching masterbatch is stirred and mixed to complete the color matching of the required color paint. The paste cover has the functions of stirring and manually controlling the pouring of color masterbatch. At present, the color matching formulas of manufacturers (such as Xinjin, DuPont, PPG, BASF) in the world that make automobile refinishing paints are all designed according to the weight ratio.

There are two advantages of using the weight ratio for manual paint pouring and color matching:

1. It is convenient to pour out the required amount of color masterbatch from the color masterbatch bucket, and it is also convenient to control the pouring amount: as long as it is observed that the required weight on the weighing scale is close, the pouring speed of the color masterbatch is gradually slowed down by hand to make it get close to the required pouring weight slowly, until the required color masterbatch weight is finally reached, pouring out the masterbatch is stopped. Other color matching masterbatches are poured and weighed according to the same method;

2. Several color masterbatches that need to be matched can be poured into a container and directly stirred evenly: for example, if three color masterbatches are needed to match one color, the weight of each color masterbatch is 1.1 g for A, 2.2 g for B and 3.3 g for C. An empty bucket may be put on the electronic scale, and the weight may be reset. A color masterbatch is poured into the empty bucket until the electronic scale shows 1.1 g. The electronic scale is reset, and then the B color paste is poured until the electronic scale shows 2.2 g; then, the electronic scale is reset, and the C color masterbatch is poured until the electronic scale shows 3.3 g. Finally, the three color masterbatches are evenly stirred with a stirring ruler to complete the color mixing.

The use of weight for color matching is the first natural choice in the history of color matching. In order to avoid that the ratio of color masterbatch can not be accurately known and the requirement of color masterbatch can not be accurately controlled by empirical color matching, the most convenient weight ratio method for accurate color matching is proposed on the basis of empirical color matching.

In theory, it is also valid to use volume ratio for color matching. However, the volume ratio color matching method established in theory is difficult to realize in practice. There are several ways to get the color matching masterbatch of the required volume by the volume ratio matching method: Idea 1: pour the color masterbatch into the measuring cup manually, and observe and control the amount of poured color masterbatch manually according to the volume scale of the measuring cup. However, there is a problem. Due to the characteristics of color paint, the precision of determining the volume of the color masterbatch by observing the volume scale of the measuring cup by human eyes can not reach the required precision of 0.1 g by weight. Especially, when a large amount of color paint is used, the volume of the measuring cup will be larger, and the cross-sectional area of the measuring cup will be larger, so the error of determining whether the color masterbatch reaches the specified position of the volume scale by human eyes will be greater, which simply cannot meet the color matching accuracy requirement, that is, 0.1 g. Moreover, the inaccurate manual matching method by volume is much more difficult and cumbersome in actual operation than the weight ratio color matching method, such that it can not realize effective color matching; Idea 2: specific gravity cup method: it is difficult to obtain the required volume in practice because of the wall-hanging residue of color masterbatch and the discontinuity of volume measurement; Idea 3: method of manual volume measurement and dispensing using a dispensing tube: because the extracted color masterbatch hanging at the dispensing tube head, it will cause accuracy error, and it is laborious and not environmentally friendly to remove the hanging color masterbatch; if it is not cleaned, it will flow to the outlet of the needle tube head and affect the error guarantee below 0.1 g. . . . Similarly, it is very hard to manually inject viscous color masterbatch, and people with little strength cannot even push it. Although reducing the dispensing tube diameter can reduce the dispensing force and improve the single push-out accuracy, for accurate dispensing of a large amount of color masterbatch, it needs to be extracted from the color masterbatch container for many times, and the hanging color masterbatch at the dispensing nozzle must be removed for each extraction, and the increase of times of extraction will increase the cumulative error, at this time, the error of 0.1 g is more difficult to control. Moreover, it is much more complicated than the weight ratio method currently used. The color matching industry will of course choose the weight ratio method which is simple and easy to realize, and will not choose the volume ratio method which is laborious and difficult to guarantee the accuracy.

After the appearance of the weight ratio color matching method, the technicians in the industry did not consider using volume ratio to realize color matching. Because from the past to the present, after analyzing the above-mentioned influencing factors, people in the industry decided that it could not replace the weight ratio mixing and color matching, which was imperceptibly in the minds of the people in the industry and had become a technical prejudice.

SUMMARY OF THE PRESENT INVENTION

Automobile refinishing paints has a history of more than 100 years, and the colors are all matched by weight ratio. The main reason is that the volume measurement is not accurate, and the proposed equipment cannot meet the demand. The first-class foreign manufacturers cannot solve this problem for a long time. People have generally thought that automobile paint can only be measured by weight ratio. This is also the case for automobile refinishing paints in the common technology. For example, Automobile Coatings, written by Wang Minxin and Wang Lijun, published by Chemical Industry Press, 2005-7.6.3, clearly pointed out that electronic scales should be used to weigh coatings, and colored coatings should be added in small quantities in multiple batches to avoid excessive materials, and a small amount of coatings should be prepared first every time, and after the perfect matching of the paint, the ratio should be expanded according to the needs. It can be seen that it is common knowledge in this field, which causes people to form technical prejudice and cannot think of weighting by volume ratio.

In order to overcome the technical prejudice, the present invention provides a weight-volume mixing color matching method for automobile refinishing paints with accurate color masterbatch matching.

A weight-volume mixing color matching method for automobile refinishing paints, comprising the following steps:
(1) finding out an automobile information ID card printed with a color number on an automobile body to be refinished, finding out a color code of the automobile body or getting a close color card code through comparison, and finding out a weight formula of the refinishing paints to be used through a reader or a computer color-matching system; or using a spectrophotometer to detect coatings of the automobile body to be refinished at a position where a surface of the coatings is complete, and outputting a weight formula of the refinishing paints after calculation;
(2) converting the weight formula of the refinishing paints into a corresponding volume formula of the refinishing paints according to a measured specific gravity of a color masterbatch;
(3) calculating types of the required color masterbatches and volumes required for each of the color masterbatches according to the volume formula of the refinishing paints and the area to be refinished;
(4) taking, by a color masterbatch dispensing mechanism and a reclamation mechanism of an automobile refinishing paint color mixer, the required color masterbatches according to the types and the volumes of the required color masterbatches.

The weight-volume mixing color matching method further comprising the following steps:
(3) calculating the types of the required color masterbatches and the weight required for each of the color masterbatches according to the weight formula of the refinishing paints and the area to be refinished;
(4) finding out a color masterbatch bucket corresponding to a color masterbatch A according to the types of the required color masterbatches, taking more than half V1 of the required volume V of the color masterbatch A to weigh to get a weight M1; obtaining a weight M2 by subtracting the M1 from the required weight M of the color masterbatch, converting the M2 into a volume V2 according to the specific gravity of the color masterbatch measured in step (2), and taking the color masterbatch A with the volume V2 to complete reclamation of the color masterbatch A by a reclamation mechanism of the automobile refinish color mixer;

(5) sequentially finding out color masterbatch buckets corresponding to other color masterbatches according to the required color masterbatch types, and sequentially completing the reclamation of other color masterbatches according to the method in step (4); mixing and stirring the reclaimed color masterbatches.

A criterion for more than half V1 of the required volume V of the color masterbatch A is that a maximum mass of V1 calculated according to a range of the specific gravity of the color masterbatch A is less than the required weight M of the color masterbatch.

A method for measuring the specific gravity of the color masterbatch is as follows: a color masterbatch with a predetermined volume is pumped out by using a laboratory high-precision volume pump or a volume pump of the present invention, and weighed by an electronic scale with an precision of 0.001 g or 0.01 g, and an actual specific gravity of the color masterbatch is obtained by dividing the weight by the volume.

A lifting driving mechanism arranged on a machine body, and a bracket arranged on the lifting driving mechanism 50 and capable of moving up and down and used for placing a cup supporting plate 6 and a paint mixing cup; a conveyor belt conveying mechanism horizontally arranged on the machine body 1, wherein the conveyor belt conveying mechanism comprises an intermediate conveyor belt conveying mechanism 52 arranged directly below the bracket 51, and side conveyor belt conveying mechanisms 53 respectively arranged on left and right sides of the intermediate conveyor belt conveying mechanism 52 with gaps 54 between the side conveyor belt conveying mechanisms 53 and the left and right sides of the intermediate conveyor belt conveying mechanism 52; the bracket 51 comprises two cross bars corresponding to the two gaps 54 and connecting rods connecting the two cross bars, the connecting rods are located outside the conveyor belt conveying mechanism at the corresponding position of the bracket 51, such that when upper surfaces of the two cross bars descend to be flush with an upper surface of a conveyor belt of the intermediate conveyor belt conveying mechanism 52, the connecting rods do not contact with the conveyor belt conveying mechanism; the lifting driving mechanism 50 and the conveyor belt transmission mechanism are electrically connected with a controller.

The bracket 51 is provided with a cup supporting plate 6, and a paint mixing cup is arranged on the cup supporting plate 6; when the upper surfaces of the two cross bars descend below the upper surface of the conveyor belt of the intermediate conveyor belt conveying mechanism 52, a lower surface of the cup supporting plate 6 is higher than the highest surfaces of the two cross bars and is located on a surface formed by the conveyor belt conveying mechanism.

The bracket 51 has a quadrilateral structure consisting of two parallel cross bars and two connecting bars, and a height of a lower bottom surface of the connecting bar in the area corresponding to the intermediate conveyor belt conveying mechanism 52 is higher than a height of the upper surfaces of the cross bars.

Position sensors 55 are arranged on the side conveyor belt conveying mechanisms 53 at positions corresponding to a paste receiving place of a color masterbatch turntable 4 at a lower layer of the machine body 1; a position sensor 55 is arranged on the intermediate conveyor belt conveying mechanism 52.

The lifting driving mechanism 50 is provided with a position sensor 55 at a position corresponding to a paste receiving place of an upper color masterbatch turntable 4 of the machine body 1.

The automatic automobile refinishing paint color mixer further comprises color masterbatch dispensing mechanisms arranged on color masterbatch turntables 4, and the color masterbatch dispensing mechanisms comprise paste outlet nozzles 23 controlled by a valve; the paste outlet nozzles 23 of the color masterbatch dispensing mechanisms are arranged in a circle on the color masterbatch turntables 4, and each color masterbatch turntable 4 is provided with a paste receiving place; the color masterbatch turntables 4 rotate such that each paste outlet nozzle 23 passes over the paste receiving place in turn; the machine body 1 is provided with a reclamation mechanism 5 such that the position of the paint mixing cup is switched between the paste receiving places of the respective color masterbatch turntables 4.

At least two color masterbatch turntables 4 rotatably arranged on the machine body 1 driven by a rotary driving mechanism, wherein one color masterbatch turntable 4 is located on the upper layer of the machine body, and at least one color masterbatch turntable 4 is located on the lower layer of the machine body.

The reclamation mechanism 5 comprises a lifting driving mechanism 50 arranged on a machine body 1, and a bracket 51 arranged on the lifting driving mechanism 50 and capable of moving up and down and used for placing a cup supporting plate 6 and a paint mixing cup; a conveyor belt conveying mechanism horizontally arranged on the machine body 1, wherein the conveyor belt conveying mechanism comprises an intermediate conveyor belt conveying mechanism 52 arranged directly below the bracket 51, and side conveyor belt conveying mechanisms 53 respectively arranged on left and right sides of the intermediate conveyor belt conveying mechanism 52 with gaps 54 between the side conveyor belt conveying mechanisms 53 and the left and right sides of the intermediate conveyor belt conveying mechanism 52; the bracket 51 comprises two cross bars corresponding to the two gaps 54 and a connecting rod connecting the two cross bars, the connecting rods are located outside the conveyor belt conveying mechanism at the corresponding position of the bracket 51, such that when upper surfaces of the two cross bars descend to be flush with an upper surface of a conveyor belt of the intermediate conveyor belt conveying mechanism 52, the connecting rods do not contact with the conveyor belt conveying mechanism; the lifting driving mechanism 50 and the conveyor belt transmission mechanism are electrically connected with a controller.

The bracket 51 is provided with a cup supporting plate 6, and a paint mixing cup is arranged on the cup supporting plate 6; when the upper surfaces of the two cross bars descend below the upper surface of the conveyor belt of the intermediate conveyor belt conveying mechanism 52, a lower surface of the cup supporting plate 6 is higher than highest surfaces of the two cross bars and is located on a surface formed by the conveyor belt conveying mechanism.

Position sensors 55 are arranged on the side conveyor belt conveying mechanisms 53 at positions corresponding to the paste receiving places of the color masterbatch turntable 4 at the lower layer of the machine body; a position sensor 55 is arranged on the intermediate conveyor belt conveying mechanism 52; a position sensor 55 is arranged on the lifting driving mechanism 50 at a position corresponding to the paste receiving places of the color masterbatch turntables 4 on the upper layer of the machine body.

The color masterbatch dispensing mechanism is a color masterbatch constant volume dispensing mechanism 2, and comprises a color masterbatch bucket 20 connected with a volumetric metering pump 22 driven by a driving mechanism for constant volume dispensing through a valve body 21, the valve body 21 being provided with a paste outlet nozzle 23.

The valve body 21 of the color masterbatch constant volume dispensing mechanism 2 is provided with a valve body lever 24, and a dispensing channel 25 is arranged in the valve body 21; the machine body 1 is provided with a material receiving and paint mixing part 3 located above a paste outlet, and the material receiving and paint mixing part 3 is provided with a valve motor 33 which toggles the valve body lever 24 to rotate so as to enable the dispensing channel 25 to communicate with or isolate from the paste outlet nozzle 23; the volumetric metering pump 22 is a piston pump; a second linear driving mechanism 34 is arranged above the valve motor 33 on the material receiving and paint mixing part 3, and a pull rod head baffle 340 capable of moving up and down is arranged on the second linear driving mechanism 34 to lift or press down a piston rod 26 of the piston pump.

A drip receiving box 7 driven by a driving mechanism is arranged below the valve motor 33 on the material receiving and paint mixing part 3, and the drip receiving box 7 has a drip receiving station located right above the paint mixing cup and an avoidance station avoiding the position of the paint mixing cup.

A bucket cover 201 is hermetically arranged on the color masterbatch bucket 20, and a breathing valve 205 is arranged on the bucket cover; a stirring shaft 202 driven by a driving mechanism to rotate is arranged in the color masterbatch bucket, one end of the stirring shaft 202 extends into the color masterbatch bucket, and a spiral stirring blade is arranged on the stirring shaft 202; the valve body 21 is a backflow valve, and the volumetric metering pump 22 is a large and small combination pump.

A code scanning module is arranged on the material receiving and paint mixing part 3, and a QR code is arranged on the color masterbatch constant volume dispensing mechanism 2.

The lower layer of the machine body 1 is provided with two color masterbatch turntables 4, and the three color masterbatch turntables 4 are arranged in the form of a triangle.

The method has the following beneficial effects: (beneficial effects of the method) for the situation that the specific gravity of the color masterbatch is stable or the demand of the color masterbatch is relatively small, accurate color masterbatch can be obtained by using the volume method, the structure is simple, the measurement is accurate, and the technical prejudice is overcome. For the color masterbatch with unstable specific gravity and large change, using volume alone will cause inaccurate amount of added color masterbatch, thus affecting paint mixing, especially when the required color masterbatch ratio is large. According to the weight-volume mixing color matching method of the present invention, the required volume is firstly calculated, and color masterbatches with different volumes are dispensed twice, the first time is large in volume, the remaining required weight is calculated after weighing, and then converted into volume for dispensing. In this way, the volume of the second dispensing is relatively small, even if the change of specific gravity of the color masterbatch is relatively large, as the volume of the second dispensing is small, the absolute error is relatively small. This error amount is within an acceptable error range relative to the whole required color masterbatch amount.

In addition, a plurality of turntable structures on the upper and lower floors and a corresponding reclamation mechanism for conveying paint mixing cups are arranged, which not only solves the problem that a large amount of space is occupied by the arrangement of various color masterbatches of automobile refinishing paints, but also has simple reclamation structure, low cost and less time required for reclaiming materials. The whole device utilizes space and reduces cost to the greatest extent.

Description of reference numerals: 1 is a machine body, 2 is a color masterbatch constant volume dispensing mechanism, 3 is a material receiving and paint mixing part, 4 is a color masterbatch turntable, 5 is a reclamation mechanism, 6 is a cup supporting plate, 7 is a drip receiving box, 20 is a color masterbatch bucket, 21 is a valve body, 22 is a volumetric metering pump, 23 is a paste outlet nozzle, 24 is a valve body lever, 25 is a dispensing channel, 26 is a piston rod, 33 is a valve motor, 34 is a second linear driving mechanism, 50 is a lifting driving mechanism, 51 is a bracket, 52 is a intermediate conveyor belt conveying mechanism, 53 is a side conveyor belt conveying mechanism, 54 is a gap, 55 is a position sensor, 201 is a bucket cover, 202 is a stirring shaft, 205 is a breathing valve, 207 is a spiral stirring blade, 340 is a pull rod head baffle, 341 is a lead screw, and 342 is a nut.

DETAILED DESCRIPTION OF THE INVENTION

For the situation that the specific gravity of the color masterbatch is stable or the demand of the color masterbatch is relatively small, accurate color masterbatch can be taken by using the volume method. The method for color matching by volume ratio is as follows:

The volume color matching method for automobile refinishing paints comprises the following steps:
(1) finding out an automobile information ID card printed with a color number on an automobile body to be refinished, finding out a color code of the automobile body or comparing to find out a close color card code, and finding out a weight formula of the refinishing paints to be used by using a reader or a computer color-matching system; or using a spectrophotometer to detect coatings of the automobile body to be refinished at a position where a surface of the coatings is complete, and outputting a weight formula of the refinishing paints after calculation;
(2) converting the weight formula of the refinishing paints into a corresponding volume formula of the refinishing paints according to a measured specific gravity of a color masterbatch;
(3) calculating types and volumes of required color masterbatches according to the volume formula of the refinishing paints and an area to be refinished;
(4) taking the color masterbatches according to the required types and volumes of the color masterbatches, and mixing the color masterbatches.

The method for measuring the specific gravity of the color masterbatch is to pump out the color masterbatch with a predetermined volume, such as 30 ml, by using the high-precision volume pump of the present invention. Weigh with an electronic scale with a precision of ±0.001 g or ±0.01 g, and divide the weight by the volume to obtain the actual specific gravity of the color masterbatch. It can be tested once or several times to get the average value. This method is suitable for color masterbatch with relatively stable density. At present, in the field of color matching of automobile refinishing paints, all kinds of color pastes are prepared according to the weight ratio. This method requires additional weighing devices such as electronic scales. The automobile refinishing paints prepared with various color pastes according to the volume ratio to achieve the predetermined effect does not need a weighing device, thus achieving a simple structure.

For the color masterbatch with unstable specific gravity and large change, the use of volume will cause inaccurate added color masterbatch, thus affecting paint mixing, especially when the required amount of color masterbatch is relatively large. In order to be accurate, the following weight-volume mixing color matching method can be adopted.

The weight-volume mixing color matching method for automobile refinishing paints comprises the following steps:
(1) finding out an automobile information ID card printed with a color number on an automobile body to be refinished, finding out a color code of the automobile body or comparing to find out a close color card code, and finding out a weight formula of the refinishing paints to be used by using a reader or a computer color-matching system; or using a spectrophotometer to detect coatings of the automobile body to be refinished at a position where a surface of the coatings is complete, and outputting a weight formula of the refinishing paints after calculation;
(2) converting the weight formula of the refinishing paints into a corresponding volume formula of the refinishing paints according to a measured specific gravity of a color masterbatch;
(3) calculating the types of the required color masterbatches and the volume required for each of the color masterbatches according to the volume formula of the refinishing paints and the area to be refinished; calculating the types of the required color masterbatches and the weight required for each of the color masterbatches according to the weight formula of the refinishing paints and the area to be refinished;
(4) finding a color masterbatch bucket corresponding to a color masterbatch A according to the types of the required color masterbatches, taking a volume more than half V1of the required volume V of the color masterbatch A, and weighing the color masterbatch A taken to get M1; obtaining a weight M2 by subtracting the M1 from the required weight M of the color masterbatch, converting the M2 into a volume V2 according to the specific gravity of the color masterbatch measured in step (2), and taking the color masterbatch A with the volume V2 to complete taking the color masterbatch A;
(5) sequentially finding out the color masterbatch buckets corresponding to other color masterbatches according to the required color masterbatch types, and sequentially completing taking of other color masterbatches according to the method in step (4); mixing and stirring the reclaimed color masterbatches.

The criterion for more than half V1 of the required volume V of the color masterbatch A is that a maximum mass of V1 calculated according to a range of the specific gravity of the color masterbatch A is less than the required weight M of the color masterbatch. A color masterbatch with a predetermined volume is pumped out by using a laboratory high-precision volume pump or a volume pump of the present invention, and weighed by an electronic scale with a precision of 0.001 g or 0.01 g, and an actual specific gravity of the color masterbatch is obtained by dividing the weight by the volume. In this method, the required volume is firstly calculated, and color masterbatches with different volumes are dispensed twice, the volume of the first time is large, the remaining required weight is calculated after weighing the color masterbatches dispensed for the first time, and then converted into volume for dispensing. In this way, the volume of the color masterbatches dispensed for the second time is relatively small, even if the change of specific gravity of the color masterbatch is relatively large, as the volume of the second dispensing is small, the absolute error is relatively small. This error amount is within an acceptable error range relative to the whole required color masterbatch amount.

As shown in FIGS. 1-7, the automatic automobile refinishing paint color mixer includes at least two color masterbatch turntables 4 rotatably arranged on the machine body 1 driven by a rotary driving mechanism, wherein one color masterbatch turntable 4 is located on the upper layer of the machine body, and at least one color masterbatch turntable 4 is located on the lower layer of the machine body 1; a color masterbatch dispensing mechanisms is arranged on color masterbatch turntables 4, and the color masterbatch dispensing mechanisms comprise paste outlet nozzles 23 controlled by a valve; the paste outlet nozzles 23 of the color masterbatch dispensing mechanisms are arranged in a circle on the color masterbatch turntables 4, and each color masterbatch turntable 4 is provided with a paste receiving place; the color masterbatch turntables 4 rotate such that each paste outlet nozzle 23 passes over the paste receiving place in turn; the machine body 1 is provided with a reclamation mechanism 5 such that the position of the paint mixing cup is switched between the paste receiving places of the respective color masterbatch turntables 4.

Figure 7:
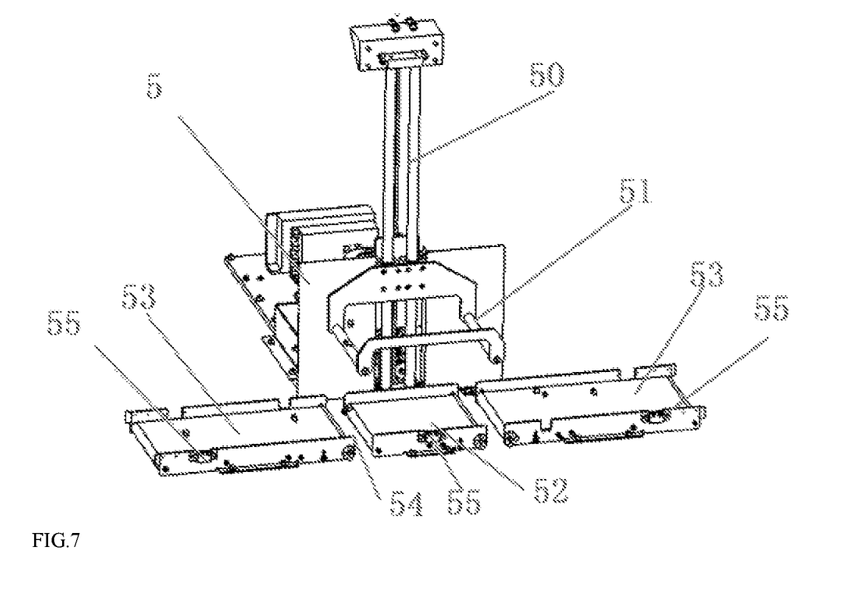
FIG. 7 shows the reclamation mechanism.

The reclamation mechanism 5 comprises a lifting driving mechanism 50 arranged on a machine body 1, and a bracket 51 arranged on the lifting driving mechanism 50 and capable of moving up and down and used for placing a cup supporting plate 6 and a paint mixing cup; a conveyor belt conveying mechanism horizontally arranged on the machine body 1 at a lower position; the conveyor belt conveying mechanism comprises an intermediate conveyor belt conveying mechanism 52 arranged directly below the bracket 51, and side conveyor belt conveying mechanisms 53 respectively arranged on, left and right sides of the intermediate conveyor belt conveying mechanism 52 with gaps 54 between the side conveyor belt conveying mechanisms 53 and the left and right sides of the intermediate conveyor belt conveying mechanism 52. The intermediate conveyor belt conveying mechanism 52 and the side conveyor belt conveying mechanism 53 are respectively driven by pulleys which is driven by speed reducing motors to rotate, thereby driving the conveyor belts to rotate. The bracket 51 comprises two cross bars corresponding to the two gaps 54 and a connecting rod connecting the two cross bars, the connecting rods are located outside the conveyor belt conveying mechanism at the corresponding position of the bracket 51, such that when upper surfaces of the two cross bars descend to be flush with an upper surface of a conveyor belt of the intermediate conveyor belt conveying mechanism 52, the connecting rods do not contact with the conveyor belt conveying mechanism; the lifting driving mechanism 50 and the conveyor belt transmission mechanism are electrically connected with a controller.

The bracket 51 is provided with a cup supporting plate 6, and a paint mixing cup is arranged on the cup supporting plate 6; when the upper surfaces of the two cross bars descend below the upper surface of the conveyor belt of the intermediate conveyor belt conveying mechanism 52, a lower surface of the cup supporting plate 6 is higher than highest surfaces of the two cross bars and is located on a surface formed by the conveyor belt conveying mechanism.

The connecting rods are located outside the conveyor belt conveying mechanism at the corresponding position of the bracket 51, such that the connecting rods are located at positions on both sides of the intermediate conveyor belt conveying mechanism 52 or at positions other than both sides. When the cross bars descend into the gap 54, if the connecting rods are located outside the conveyor belt conveying mechanism, they must not contact. At this time, there is no structure on the conveyor belt conveying mechanism that hinders the movement of the bracket. If the connecting rods are located at two sides of the conveyor belt conveying mechanism, the two sides here refer to two sides parallel to the conveying direction; that is, the bracket 51 has a quadrilateral structure composed of two cross bars and two connecting bars, and the height of the lower bottom surface of the area where the connecting bars correspond to the intermediate conveyor belt conveying mechanism 52 is higher than that of the upper surface of the cross bars. At this time, the height of the lower bottom surface of the connecting rods are higher than that of the upper surface of the cross bar, and the connecting rods do not affect the transmission. The lifting driving mechanism 50 can be a lead screw nut mechanism; it comprises a lead screw arranged on the machine body 1, and a nut is connected to the bracket 51. The cup supporting plate 6 is provided with a groove with adjustable height, which is specially used for placing paint mixing cups.

The specific reclamation mode is to move from the upper layer paste taking place to the lower layer paste taking place: the lifting driving mechanism 50 drives the bracket 51 to move down to the cross bar in the gap, and the upper surface of the cross bar is lower than the upper surface of the conveyor belt in the conveyor belt conveying mechanism 52. At this time, the cup supporting plate 6 on the two cross bars falls to the upper surface of the intermediate conveyor belt conveying mechanism 52. The intermediate conveyor belt conveying mechanism 52 and the side conveyor belt conveying mechanism 53 corresponding to the lower paste taking place rotate to convey the cup supporting plate 6 and the paint mixing cup to the corresponding paste taking place. When returning from the lower layer to the upper layer, the steps are reversed.

A position sensor 55 is arranged on the side conveyor belt conveying mechanism 53 at the position corresponding to the paste receiving place of the color masterbatch turntable of at the lower layer of the machine body. A position sensor (55) is arranged on the intermediate conveyor belt conveying mechanism (52); the lifting driving mechanism (50) is provided with a position sensor (55) at a position corresponding to a paste receiving place of an upper color masterbatch turntable (4) of the machine body (1). When the position sensor senses it, it sends out a signal, and the control system controls the intermediate conveyor belt conveying mechanism 52 or the side conveyor belt conveying mechanism 53 to start or stop. The feeding mechanism 5 can be used for volume ratio color matching, as well as weight-volume mixing color matching. By adopting volume ratio color matching, the color masterbatch dispensing mechanism on the color masterbatch turntable 4 can use a constant volume dispensing mechanism. However, in the case of weight-volume mixing, it is necessary to use a constant volume dispensing mechanism for the color masterbatch dispensing mechanism on the color masterbatch turntable 4, and to place the paint mixing cup on the electronic scale which moves along with the cup supporting plate 6.

Figure 3:
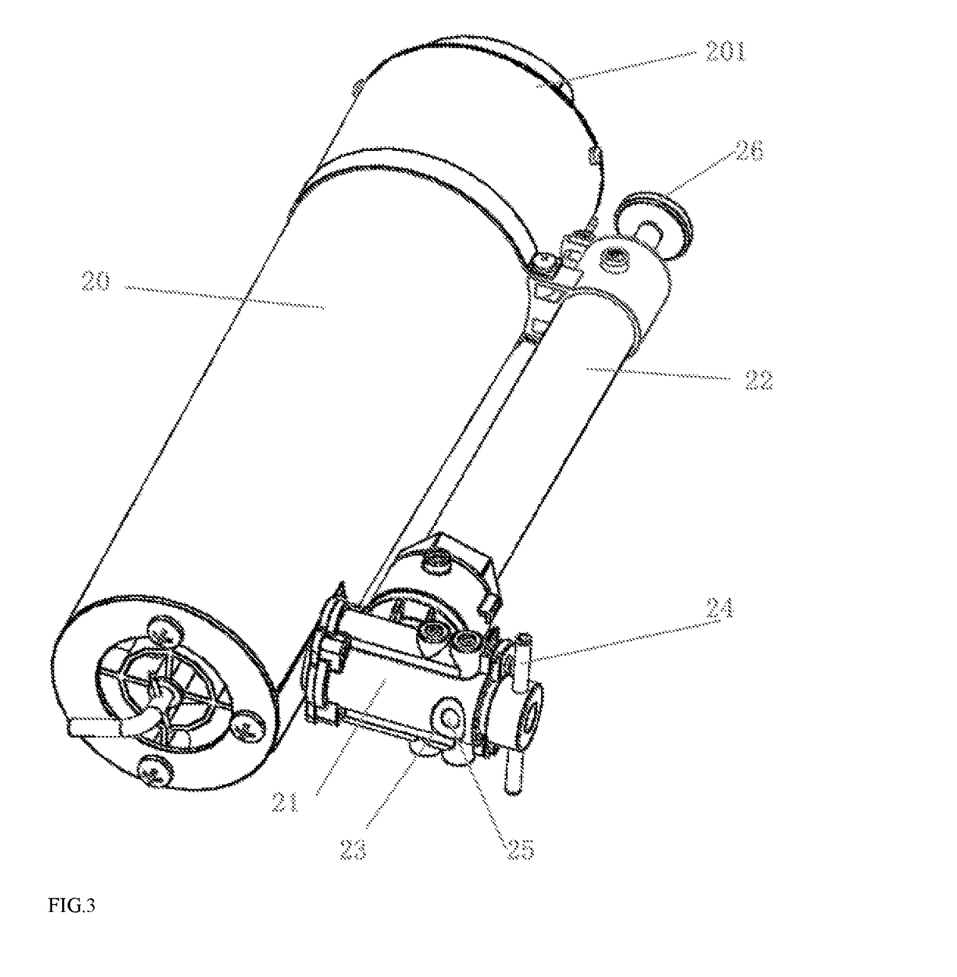
FIG. 3 is a schematic diagram of a color masterbatch constant volume dispensing mechanism.
Figure 4:
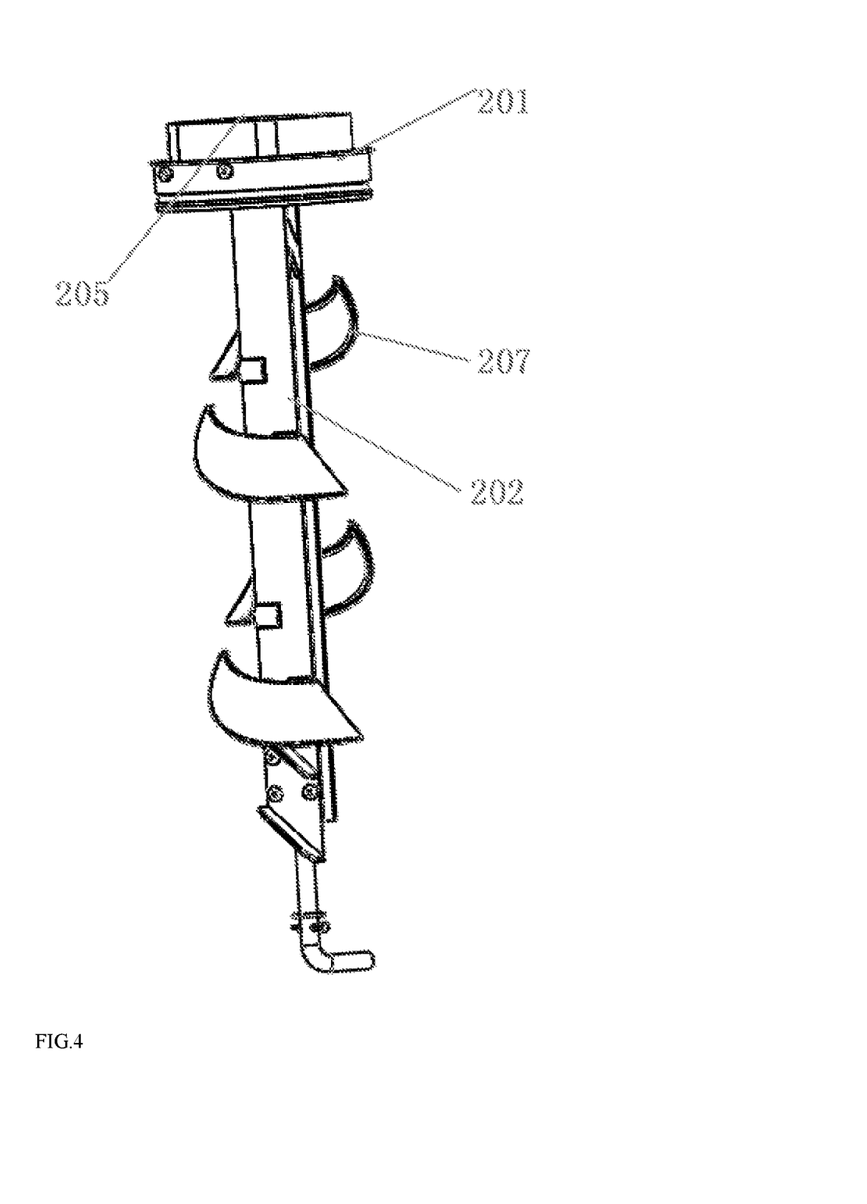
FIG. 4 is an internal structure diagram of FIG. 3.

When the color masterbatch dispensing mechanism is a color masterbatch constant volume dispensing mechanism 2, it comprises a color masterbatch bucket 20 connected with a volumetric metering pump 22 driven by a driving mechanism for constant volume dispensing through a valve body 21; the valve body 21 is provided with a paste outlet nozzle 23. The valve body 21 has on-off and commutation functions. The volumetric metering pump 22 may be a volumetric pump driven by a stepping motor, a servo motor, or a direct motor, such as a piston pump or a plunger pump.

Figure 5:
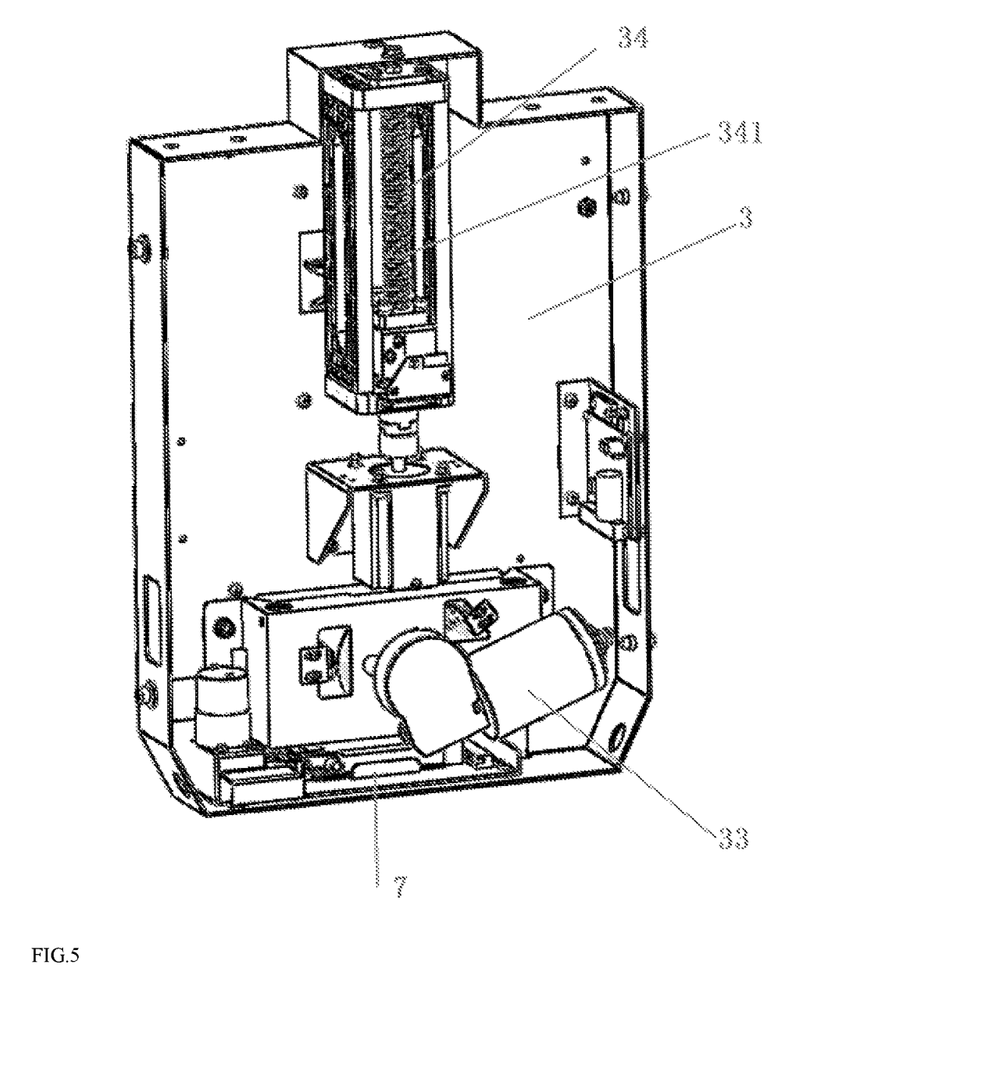
FIG. 5 is a schematic diagram of material receiving and paint mixing parts.

The valve body 21 of the color masterbatch constant volume dispensing mechanism 2 is provided with a valve body lever 24, and a dispensing channel 25 is arranged in the valve body 21. The machine body 1 is provided with a material receiving and paint mixing part 3 located above a paste outlet, and the material receiving and paint mixing part 3 is provided with a valve motor 33 which toggles the valve body lever 24 to rotate so as to enable the dispensing channel 25 to communicate with or isolate from the paste outlet nozzle 23. The valve motor 33 is provided with a lever, and the lever rotates to make the valve body lever 24 rotate.

Figure 6:
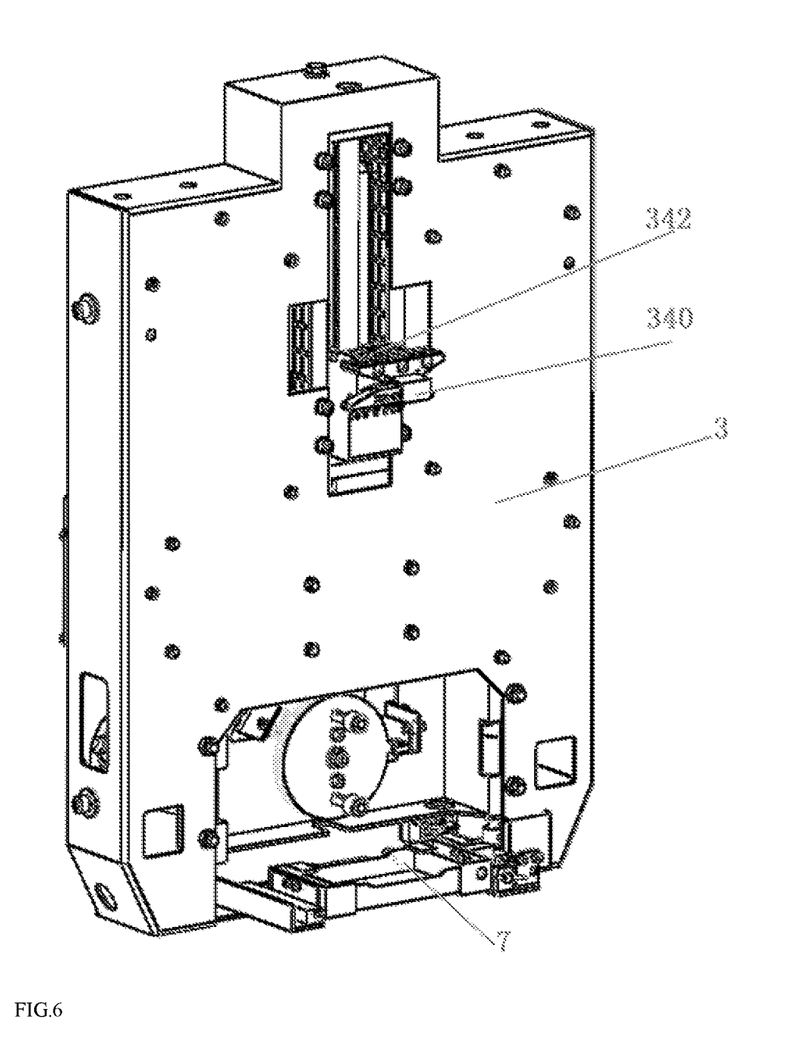
FIG. 6 is a schematic reverse view of FIG. 5.

The volumetric metering pump 22 can be a piston pump; a second linear driving mechanism 34 is arranged above the valve motor 33 on the material receiving and paint mixing part 3, and a pull rod head baffle 340 capable of moving up and down is arranged on the second linear driving mechanism 34 to lift or press down a piston rod 26 of the piston pump. The second linear driving mechanism 34 can be a lead screw nut mechanism; the material receiving and paint mixing part 3 is provided with a lead screw 341 driven by a second servo motor to rotate, and a nut 342 is provided on the lead screw, the nut 342 is connected with the pull rod head baffle 340. The pull rod head baffle comprises a groove structure, and the piston head of the piston rod leaves or enters the groove of the groove mechanism when the color masterbatch bucket rotates. The nut 342 moves up and down such that the piston rod moves up and down, thus sucking away the color masterbatch from the color masterbatch bucket and pumping out the color masterbatch.

A drip receiving box 7 driven by a driving mechanism is also arranged below the valve motor 33 on the material receiving and paint mixing part 3, and the drip receiving box 7 has a drip receiving station located right above the paint mixing cup and an avoidance station avoiding the position of the paint mixing cup. A third linear motion mechanism is arranged on the material receiving and paint mixing part 3, for example, a motor drives a gear, the gear rotates to drive a rack to move, and the drip receiving box 7 is connected with the rack to move together. Or an air cylinder is arranged on the moving frame, and the piston rod of the air cylinder drives the drip receiving box 7 to move together. After the dispensing channel 25 is closed, that is, after the paste outlet nozzle 23 stops discharging paste, there may be residual color paste. A drip receiving box 7 is provided. After the dispensing channel 25 is closed, the drip receiving box 7 moves directly below the paste outlet nozzle 23 to prevent the residual color paste from dripping into the paint mixing cup and affecting the accuracy.

A bucket cover 201 is hermetically arranged on the color masterbatch bucket 20, and a breathing valve 205 is arranged on the bucket cover; a stirring shaft 202 driven by a driving mechanism to rotate is arranged in the color masterbatch bucket, one end of the stirring shaft 202 extends into the color masterbatch bucket, and a spiral stirring blade 207 is arranged on the stirring shaft 202. A corrosion-resistant sealing ring is arranged between the color masterbatch bucket 20 and the bucket cover 201, and the sealing ring is made of corrosion-resistant material, so as to adapt to the corrosiveness of the color masterbatch of the automobile paint. The spiral stirring blade 207 is a kind of bubble-cutting blade, which can throw the color masterbatch onto the bucket wall during stirring, and throw out or break bubbles, which is convenient for volume measurement. Because the more bubbles, the less accurate the volume measurement. This is different from the stirring blade used in latex paint. For the stirring driving mode of the stirring shaft 202, please refer to the latex paint stirring driving mode of the turntable structure, which is a prior art and will not be described in detail here.

The breathing valves 205 is two check valves with opposite directions. The valve body 21 is a backflow valve, and the volumetric metering pump 22 is a large and small combination pump. The structure of the backflow valve and the large and small combination pump can be as the valve body structure and pump structure in patent CN201410792479.7, CN201711400600.7 or CN201310045508.9. There is a backflow channel in the backflow valve. When the valve body 21 is closed, that is, no color paste is dispensed, the backflow channel communicates, that is, the valve body 21 communicates with the color masterbatch bucket 20, and the automobile refinishing paints can flow back into the color masterbatch bucket 20. As the automobile refinishing paints is sticky, if there is no backflow channel, the dispensing channel 25 is easy to dry and block, which makes it difficult to inject paint.

A code scanning module is arranged on the material receiving and paint mixing part 3, and a QR code is arranged on the color masterbatch constant volume dispensing mechanism 2. The code scanning module is a scanning gun, and the information such as the color number of the color masterbatch bucket is recorded on the QR code. To reclaim the material for the first time, it is necessary to scan the color masterbatch constant volume dispensing mechanism 2. After changing the color masterbatch bucket 20, it is also necessary to scan the changed color masterbatch bucket 20 again.

Figure 1:
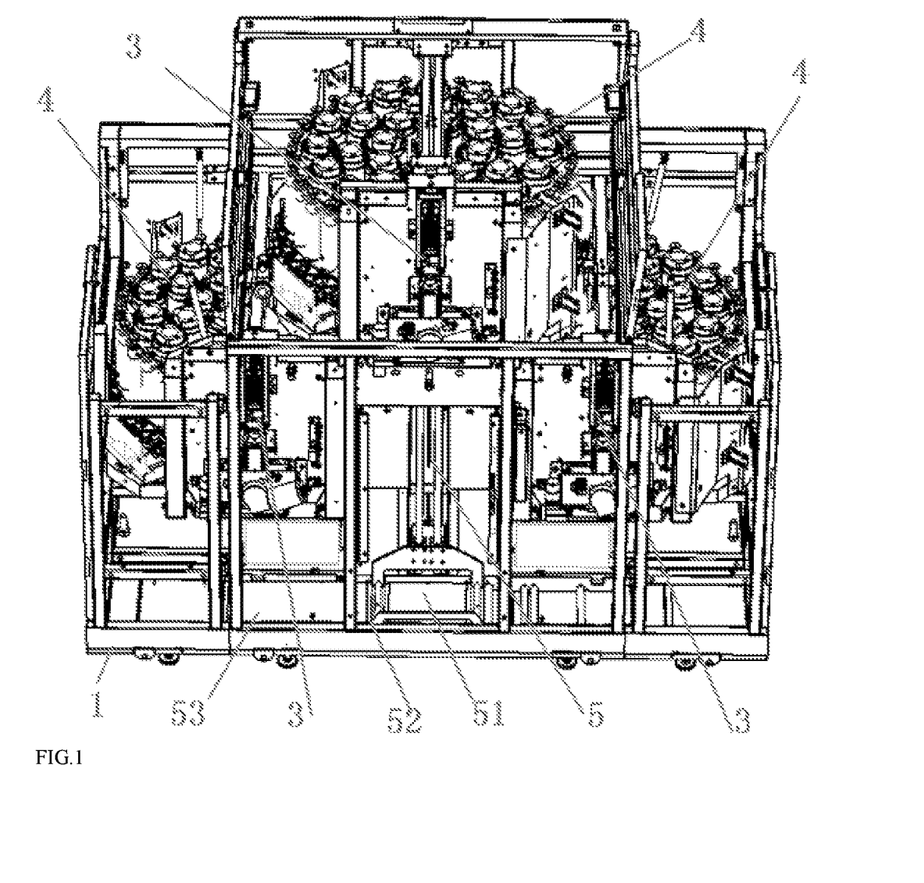
FIG. 1 is a general schematic diagram of a color mixer.
Figure 2:
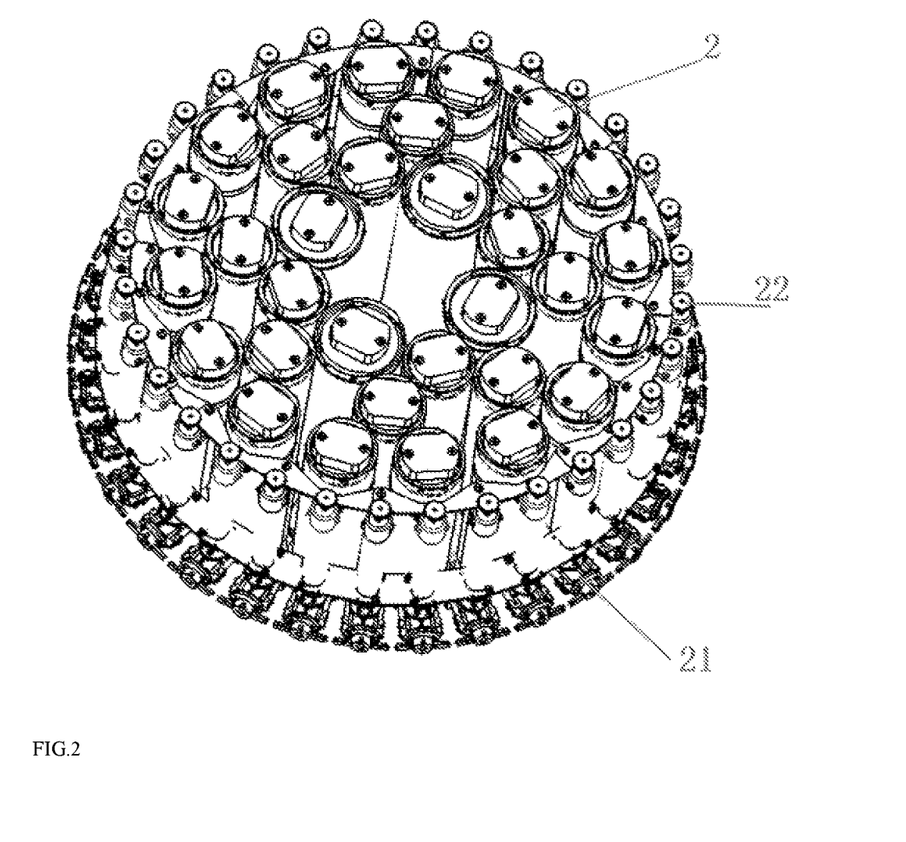
FIG. 2 is an arrangement diagram of the color masterbatch dispensing mechanism on the color masterbatch turntable.

The lower layer of the machine body 1 is provided with two color masterbatch turntables 4, and the three color masterbatch turntables 4 are arranged in the form of a triangle. This structure, in conjunction with the reclamation mechanism 5 of the present invention, can maximize the use of space. The lower color masterbatch turntable 4 is arranged on the support plate of the machine body; the support plate of the machine body is slidably arranged on the machine body 1; a handle is arranged on the outer surface of the support plate of the machine body 1. The lower color masterbatch turntable can be pulled out for convenient installation and disassembly.

Figure 8:
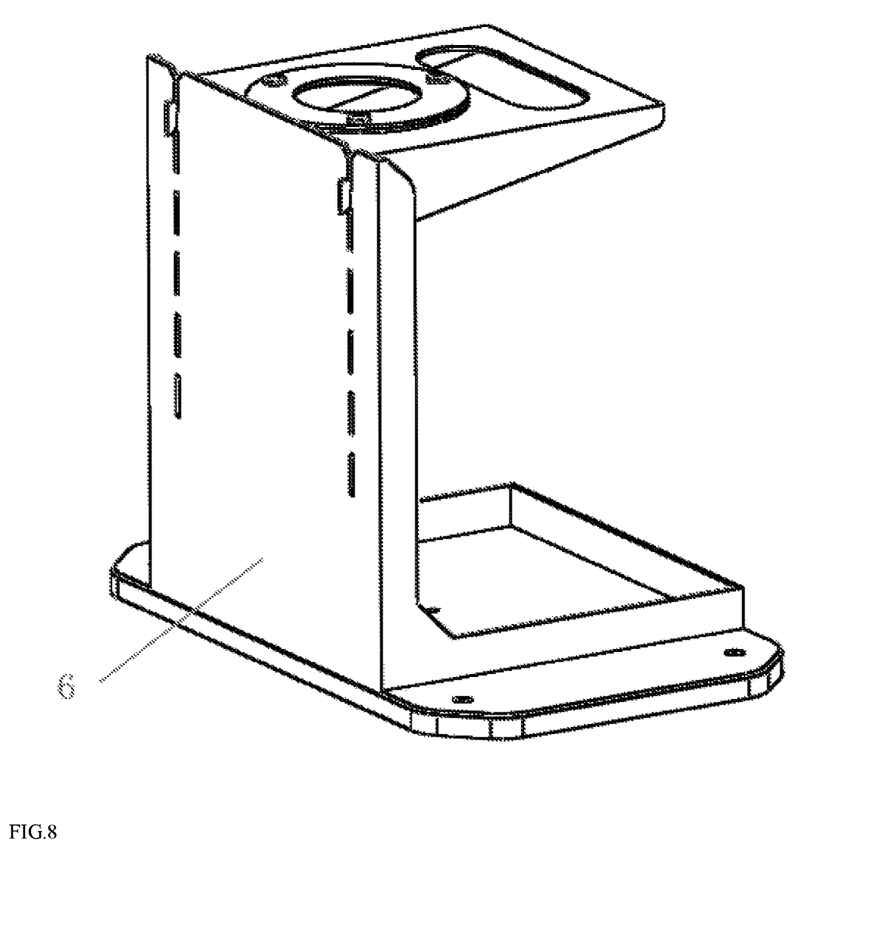
FIG. 8 is a structural diagram of the first embodiment of the cup supporting plate.
Figure 9:
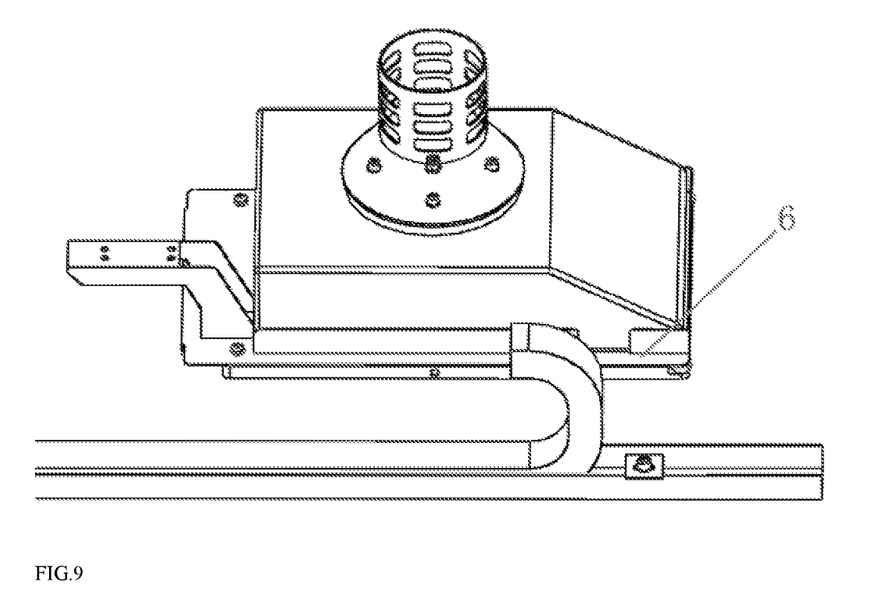
FIG. 9 is a structural diagram of the second embodiment of the cup supporting plate.

FIG. 8-9 shows two kinds of cup supporting plates. FIG. 8 is a structure without an electronic scale on the cup supporting plate. In FIG. 9, an electronic scale is arranged on the cup supporting plate, and a groove for placing a paint mixing cup is arranged on the electronic scale. The structure shown in FIG. 8 is suitable for the volume ratio color matching method. The structure shown in FIG. 9 can be used for weight-volume mixing color matching method.

In specific implementation: For the volume color matching method: firstly, the system detects the weight ratio of automobile refinishing paints, converts the volume ratio required by automobile refinishing paints based on the volume color matching method, and finds out the position of the corresponding color masterbatch constant volume dispensing mechanism 2. The reclamation mechanism 5 moves the cup supporting plate 6 and the paint mixing cup to the position corresponding to the paste taking position of the color masterbatch turntable 4, and the color masterbatch turntable 4 rotates such that the paste outlet nozzle 23 of the required color masterbatch constant volume dispensing mechanism 2 stops over the paint mixing cup. The second linear driving mechanism 34 starts, the lead screw 341 rotates to drive the nut 342 to move upwards, the pull rod head baffle 340 drives the piston rod 26 of the volumetric metering pump 22 to rise to extract the color paste, and after the piston rod 26 descends by a preset displacement, the valve motor 33 starts, the dispensing channel 25 of the valve body 21 communicates with the paste outlet nozzle 23, the piston rod 26 continues to descend, and a predetermined amount of color paste flows out from the paste outlet 23 to the paint mixing cup. The valve motor 33 is switched off, and the drip receiving box 7 moves to a position below the paste outlet nozzle 23. The color masterbatch turntable 4 rotates to a next position where the paste outlet nozzle 23 requiring the color masterbatch reaches the paste outlet, and the drip receiving box 7 is moved away for reclamation. After the color masterbatch on this color masterbatch turntable 4 is taken, it moves to the paste taking place of the next color masterbatch turntable 4 for reclamation through the reclamation mechanism 5. After all of them are taken, the paint mixing cup moves to a predetermined position, usually on the conveyor belt of intermediate conveyor belt conveying mechanism, waiting to be taken out.

The weight-volume mixing color matching method is different from the above method in that when taking a predetermined amount of color masterbatch, it is necessary to take more than half of the color masterbatch, weigh it, calculate the remaining required weight, convert it into the remaining required volume, and inject it out.

The technical features of the above-mentioned embodiments can be combined in other ways. In order to make the description concise, all possible combinations of the technical features in the above-mentioned embodiments are not described. However, as long as there is no contradiction between the combinations of these technical features, they should be considered as the scope recorded in this description.

What is claimed is:

1. A weight-volume mixing color matching method for automobile refinishing paints, comprising:

(1) finding out an automobile information ID card printed with a color number on an automobile body to be refinished, finding out a color code of the automobile body or getting a close color card code through comparison, and finding out a weight formula of the refinishing paints to be used through a reader or a computer color-matching system; or using a spectrophotometer to detect coatings of the automobile body to be refinished at a position where a surface of the coatings is complete, and outputting a weight formula of the refinishing paints after calculation;

(2) converting the weight formula of the refinishing paints into a corresponding volume formula of the refinishing paints according to a measured specific gravity of a color masterbatch;

(3) calculating types of the required color masterbatches and volumes required for each of the color masterbatches according to the volume formula of the refinishing paints and the area to be refinished, and calculating the types of the required color masterbatches and the weight required for each of the color masterbatches according to the weight formula of the refinishing paints and the area to be refinished;

(4) finding out a color masterbatch bucket corresponding to a color masterbatch A according to the types of the required color masterbatches, taking more than half $V1$ of the required volume $V$ of the color masterbatch A and weighing the more than half volume $V1$ to get a weight $M1$; obtaining a weight $M2$ by subtracting the $M1$ from the required weight $M$ of the color masterbatch, converting the $M2$ into a volume $V2$ according to the specific gravity of the color masterbatch measured in step (2), and taking the color masterbatch A with the volume $V2$ to complete reclamation of the color masterbatch A by a reclamation mechanism of the automobile refinish color mixer; and (5) sequentially finding out color masterbatch buckets corresponding to other color masterbatches according to the required color masterbatch types, and sequentially completing the reclamation of other color masterbatches according to the method in step (4); mixing and stirring the reclaimed color masterbatches in a mixing cup, wherein a criterion for more than half $V1$ of the required volume $V$ of the color masterbatch A is that a maximum mass of $V1$ calculated according to a range of the specific gravity of the color masterbatch A is less than the required weight $M$ of the color masterbatch.

2. The weight-volume mixing color matching method for automobile refinishing paints according to claim 1, wherein a method for measuring the specific gravity of the color masterbatch is as follows: a color masterbatch with a predetermined volume is pumped out by using a laboratory high-precision volume pump or a volume pump of the present invention, and weighed by an electronic scale with an precision of 0.001 g or 0.01 g, and an actual specific gravity of the color masterbatch is obtained by dividing the weight by the volume.

3. A reclamation mechanism of an automobile refinishing paint color mixer, comprising a lifting driving mechanism arranged on a machine body, and a bracket arranged on the lifting driving mechanism and capable of moving up and down and used for placing a cup supporting plate and a paint mixing cup; a conveyor belt conveying mechanism horizontally arranged on the machine body, wherein the conveyor belt conveying mechanism comprises an intermediate conveyor belt conveying mechanism arranged directly below the bracket, and side conveyor belt conveying mechanisms respectively arranged on left and right sides of the intermediate conveyor belt conveying mechanism with gaps between the side conveyor belt conveying mechanisms and the left and right sides of the intermediate conveyor belt conveying mechanism; the bracket comprises two cross bars corresponding to the two gaps and connecting rods connecting the two cross bars, the connecting rods are located outside the conveyor belt conveying mechanism at the corresponding position of the bracket, such that when upper surfaces of the two cross bars descend to be flush with an upper surface of a conveyor belt of the intermediate conveyor belt conveying mechanism, the connecting rods do not contact with the conveyor belt conveying mechanism; the lifting driving mechanism and the conveyor belt transmission mechanism are electrically connected with a controller.

4. The reclamation mechanism of the automobile refinishing paint color mixer according to claim 3, wherein the bracket is provided with a cup supporting plate, and a paint mixing cup is arranged on the cup supporting plate; when the upper surfaces of the two cross bars descend below the upper surface of the conveyor belt of the intermediate conveyor belt conveying mechanism, a lower surface of the cup supporting plate is higher than the highest surfaces of the two cross bars and is located on a surface formed by the conveyor belt conveying mechanism.

5. The reclamation mechanism of the automobile refinishing paint color mixer according to claim 3, wherein the bracket has a quadrilateral structure consisting of two parallel cross bars and two connecting bars, and a height of a lower bottom surface of the connecting bar in the area corresponding to the intermediate conveyor belt conveying mechanism is higher than a height of the upper surfaces of the cross bars.

6. The reclamation mechanism of the automobile refinishing paint color mixer according to claim 3, wherein position sensors are arranged on the side conveyor belt conveying mechanisms at positions corresponding to a paste receiving place of a color masterbatch turntable at a lower level of the machine body; a position sensor is arranged on the intermediate conveyor belt conveying mechanism.

7. The reclamation mechanism of the automobile refinishing paint color mixer according to claim 6, wherein the lifting driving mechanism is provided with a position sensor at a position corresponding to a paste receiving place of an upper color masterbatch turntable of the machine body.

8. An automatic automobile refinishing paint color mixer, comprising a machine body and a controller, wherein the automatic automobile refinishing paint color mixer further comprises color masterbatch dispensing mechanisms arranged on color masterbatch turntables, and the color masterbatch dispensing mechanisms comprise paste outlet nozzles controlled by a valve; the paste outlet nozzles of the color masterbatch dispensing mechanisms are arranged in a circle on the color masterbatch turntables, and each color masterbatch turntable is provided with a paste receiving place; the color masterbatch turntables rotate such that each paste outlet nozzle passes over the paste receiving place in turn; the machine body is provided with a reclamation mechanism such that the position of the paint mixing cup is switched between the paste receiving places of the respective color masterbatch turntables.

9. The automatic automobile refinishing paint color mixer according to claim 8, comprising at least two color masterbatch turntables rotatably arranged on the machine body driven by a rotary driving mechanism, wherein one color masterbatch turntable is located on an upper level of the machine body, and at least one color masterbatch turntable is located on a lower level of the machine body.

10. The automatic automobile refinishing paint color mixer according to claim 8, wherein: the reclamation mechanism comprises a lifting driving mechanism arranged on a machine body, and a bracket arranged on the lifting driving mechanism and capable of moving up and down and used for placing a cup supporting plate and a paint mixing cup; a conveyor belt conveying mechanism horizontally arranged on the machine body, wherein the conveyor belt conveying mechanism comprises an intermediate conveyor belt conveying mechanism arranged directly below the bracket, and side conveyor belt conveying mechanisms respectively arranged on left and right sides of the intermediate conveyor belt conveying mechanism with gaps between the side conveyor belt conveying mechanisms and the left and right sides of the intermediate conveyor belt conveying mechanism; the bracket comprises two cross bars corresponding to the two gaps and a connecting rod connecting the two cross bars, the connecting rods are located outside the conveyor belt conveying mechanism at the corresponding position of the bracket, such that when upper surfaces of the two cross bars descend to be flush with an upper surface of a conveyor belt of the intermediate conveyor belt conveying mechanism, the connecting rods do not contact with the conveyor belt conveying mechanism; the lifting driving mechanism and the conveyor belt transmission mechanism are electrically connected with a controller.

11. The reclamation mechanism of automobile refinishing paint color mixer according to claim 10, wherein the bracket is provided with a cup supporting plate, and a paint mixing cup is arranged on the cup supporting plate; when the upper surfaces of the two cross bars descend below the upper surface of the conveyor belt of the intermediate conveyor belt conveying mechanism, a lower surface of the cup supporting plate is higher than highest surfaces of the two cross bars and is located on a surface formed by the conveyor belt conveying mechanism.

12. The reclamation mechanism of automobile refinishing paint color mixer according to claim 10, wherein: position sensors are arranged on the side conveyor belt conveying mechanisms at positions corresponding to the paste receiving places of the color masterbatch turntable at a lower level of the machine body; a position sensor is arranged on the intermediate conveyor belt conveying mechanism; a position sensor is arranged on the lifting driving mechanism at a position corresponding to the paste receiving places of the color masterbatch turntables on an upper level of the machine body.

13. The automatic automobile refinishing paint color mixer according to claim 8, wherein: the color masterbatch dispensing mechanism is a color masterbatch constant volume dispensing mechanism, and comprises a color masterbatch bucket connected with a volumetric metering pump driven by a driving mechanism for constant volume dispensing through a valve body, the valve body being provided with a paste outlet nozzle.

14. The automatic automobile refinishing paint color mixer according to claim 13, wherein: the valve body of the color masterbatch constant volume dispensing mechanism is provided with a valve body lever, and a dispensing channel is arranged in the valve body; the machine body is provided with a material receiving and paint mixing part located above a paste outlet, and the material receiving and paint mixing part is provided with a valve motor which toggles the valve body lever to rotate so as to enable the dispensing channel to communicate with or isolate from the paste outlet nozzle; the volumetric metering pump is a piston pump; a second linear driving mechanism is arranged above the valve motor on the material receiving and paint mixing part, and a pull rod head baffle capable of moving up and down is arranged on the second linear driving mechanism to lift or press down a piston rod of the piston pump.

15. The automatic automobile refinishing paint color mixer according to claim 14, wherein a drip receiving box driven by a driving mechanism is arranged below the valve motor on the material receiving and paint mixing part, and the drip receiving box has a drip receiving station located right above the paint mixing cup and an avoidance station avoiding the position of the paint mixing cup.

16. The automatic automobile refinishing paint color mixer according to claim 13, wherein: a bucket cover is hermetically arranged on the color masterbatch bucket, and a breathing valve is arranged on the bucket cover; a stirring shaft driven by a driving mechanism to rotate is arranged in the color masterbatch bucket, one end of the stirring shaft extends into the color masterbatch bucket, and a spiral stirring blade is arranged on the stirring shaft; the valve body is a backflow valve, and the volumetric metering pump is a large and small combination pump.

17. The automatic automobile refinishing paint color mixer according to claim 14, wherein a code scanning module is arranged on the material receiving and paint mixing part, and a QR code is arranged on the color masterbatch constant volume dispensing mechanism.

18. The automatic automobile refinishing paint color mixer according to claim 8, wherein an upper level of the machine body includes one masterbatch turntable, and a lower level of the machine body includes two more color masterbatch turntables, and the three color masterbatch turntables are arranged in the form of a triangle.

* * * * *